US011885165B2

(12) United States Patent
Schneider et al.

(10) Patent No.: US 11,885,165 B2
(45) Date of Patent: Jan. 30, 2024

(54) FURNITURE BOARD HAVING A HINGE, AND FURNITURE ITEM HAVING SUCH A FURNITURE BOARD

(71) Applicant: HETTICH-ONI GMBH & CO. KG, Vlotho (DE)

(72) Inventors: Mark Schneider, Porta Westfalica (DE); Felix Sander, Kirchlengern (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 0 days.

(21) Appl. No.: 16/960,968

(22) PCT Filed: Jan. 8, 2019

(86) PCT No.: PCT/EP2019/050318
§ 371 (c)(1),
(2) Date: Jul. 9, 2020

(87) PCT Pub. No.: WO2019/137899
PCT Pub. Date: Jul. 18, 2019

(65) Prior Publication Data

US 2020/0332578 A1 Oct. 22, 2020

(30) Foreign Application Priority Data

Jan. 12, 2018 (DE) ..................... 10 2018 100 674.8

(51) Int. Cl.
*E05D 3/18* (2006.01)
*E05D 5/02* (2006.01)
(Continued)

(52) U.S. Cl.
CPC ............ *E05D 3/183* (2013.01); *A47B 96/201* (2013.01); *E05D 3/122* (2013.01); *E05D 5/0276* (2013.01);
(Continued)

(58) Field of Classification Search
CPC . E05D 3/18; E05D 3/183; E05D 3/186; E05F 3/20; E05F 3/122; E05F 5/10
See application file for complete search history.

(56) References Cited

U.S. PATENT DOCUMENTS 1,873,247 A 8/1932 Abbott et al.
2,206,739 A * 7/1940 Brogren ................. E05D 3/122 16/354
(Continued)

FOREIGN PATENT DOCUMENTS

CN 203684898 U 7/2014
CN 105899746 A 8/2016
(Continued)

OTHER PUBLICATIONS

Citation of Office Action dated May 21, 2019 in related/corresponding DE Application No. 10 2018 100 674.8.
(Continued)

*Primary Examiner* — Emily M Morgan
(74) *Attorney, Agent, or Firm* — PATENT PORTFOLIO BUILDERS PLLC

(57) ABSTRACT

A furniture board includes an integrated or inserted hinge for guiding a movable furniture part. The furniture board has two side faces, an end face, and an end-face recess for receiving a hinge. The hinge includes a basic element, a linear guide and a pivot guide hinged thereto. The linear guide has forcibly guided movable elements, to which the pivot guide is hinged at a distance from the basic element. Two side faces of the furniture board lie one in a first and one in a second plane. The linear guide and the hinged connection of the pivot guide to the linear guide lie between the first and the second plane, at least in a closed state of the hinge.

15 Claims, 13 Drawing Sheets

Figure 1:
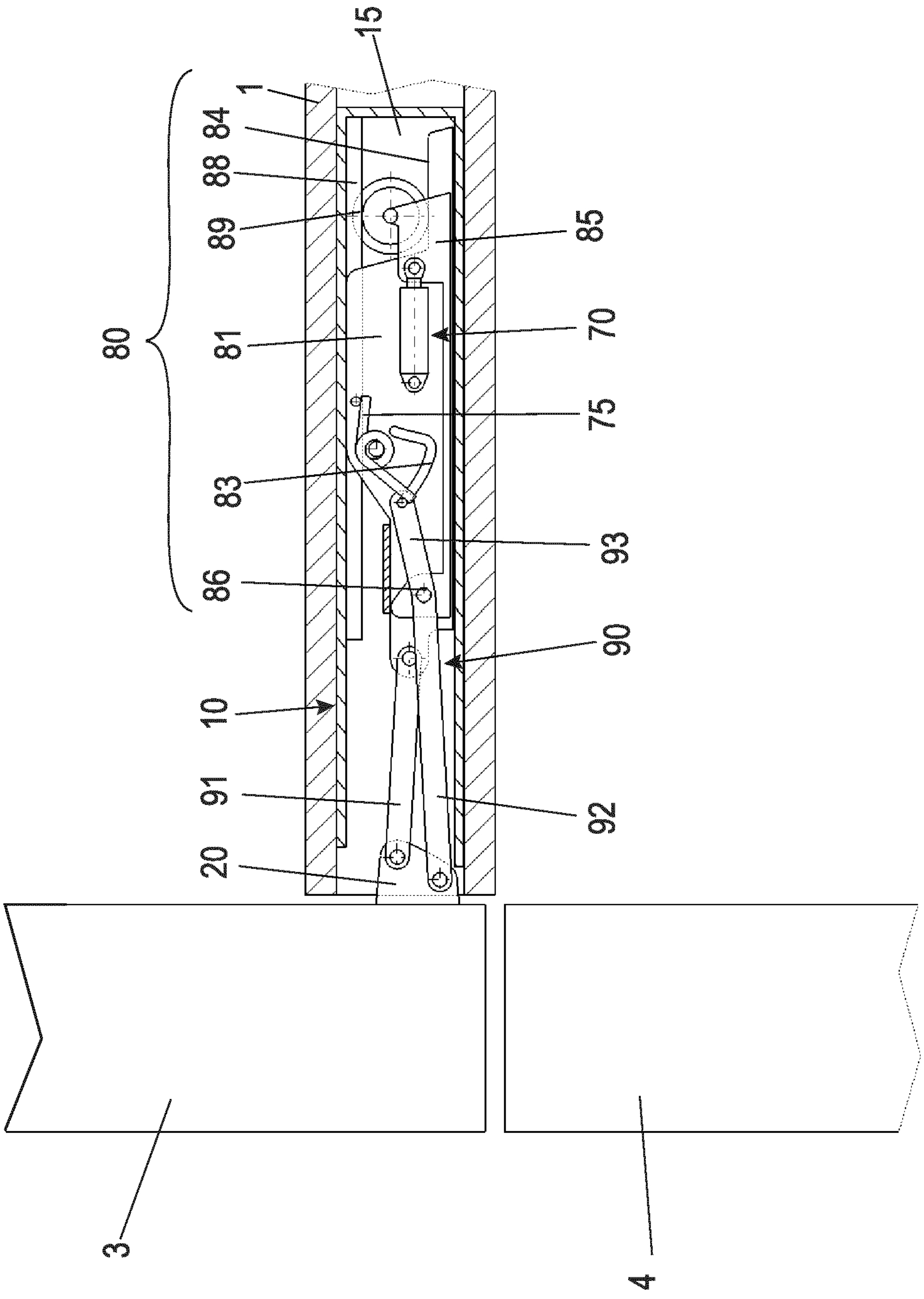

(51) Int. Cl.

| | |
|---|---|
| ***A47B 96/20*** | (2006.01) |
| ***E05D 3/12*** | (2006.01) |
| ***E05D 5/04*** | (2006.01) |
| ***E05D 13/00*** | (2006.01) |
| ***E05F 3/20*** | (2006.01) |
| ***E05F 5/00*** | (2017.01) |
| ***E05F 5/10*** | (2006.01) |

(52) U.S. Cl.

CPC ............. *E05D 5/046* (2013.01); *E05D 13/00* (2013.01); *E05F 3/20* (2013.01); *E05F 5/006* (2013.01); *E05F 5/10* (2013.01); *E05Y 2900/20* (2013.01)

(56) References Cited

U.S. PATENT DOCUMENTS

| | | | | | |
|---|---|---|---|---|---|
| 2,709,276 | A * | 5/1955 | Stein | E05D 7/14 16/288 |
| 3,548,446 | A * | 12/1970 | Hocq | E05D 3/18 16/295 |
| 4,058,932 | A | 11/1977 | Peterson et al. | |
| 6,487,755 | B1 | 12/2002 | Caldari | |
| 7,600,295 | B2 | 10/2009 | Zimmer | |
| 8,627,547 | B2 * | 1/2014 | Soh | E05F 1/1253 16/369 |
| 10,588,407 | B2 | 3/2020 | Held | |
| 10,767,407 | B2 * | 9/2020 | Salice | E05D 3/142 |
| 11,149,483 | B2 * | 10/2021 | Frye | E05D 3/122 |
| 2007/0159037 | A1 | 7/2007 | Hoffman | |
| 2017/0130497 | A1 * | 5/2017 | Yamaguchi | E05D 3/186 |
| 2021/0262270 | A1 * | 8/2021 | Daniels | E05F 1/12 |

FOREIGN PATENT DOCUMENTS

| | | | | |
|---|---|---|---|---|
| CN | 107407117 | A | 11/2017 | |
| CN | 107542350 | A | 1/2018 | |
| DE | 3202513 | A1 | 9/1982 | |
| DE | 20023445 | U1 | 5/2004 | |
| DE | 202015100934 | U1 | 5/2016 | |
| DE | 102018100672 | A1 * | 7/2019 | E05D 3/022 |
| EP | 0791712 | A1 | 8/1997 | |
| EP | 2924215 | A1 | 9/2015 | |
| JP | H0877437 | A | 3/1996 | |
| JP | 2017516001 | A | 6/2017 | |
| WO | 2010130570 | A1 | 11/2010 | |
| WO | 2012072738 | A1 | 6/2012 | |
| WO | 2017029199 | A1 | 2/2017 | |
| WO | WO-2017212453 | A1 * | 12/2017 | E05F 3/20 |
| WO | WO-2018147877 | A1 * | 8/2018 | E05D 3/186 |

OTHER PUBLICATIONS

International Search Report dated Apr. 24, 2019 in related/corresponding International Application No. PCT/EP2019/050318.

Search Report dated May 25, 2018 in related/corresponding DE Application No. 10 2018 100 674.8.

Written Opinion dated Apr. 24, 2019 in related/corresponding International Application No. PCT/EP2019/050318.

Office Action dated Aug. 4, 2021 in related/corresponding CN Application No. 201980008166.9.

Office Action dated Feb. 13, 2023 in related/corresponding EP Application No. 19 700 646.3.

* cited by examiner

FURNITURE BOARD HAVING A HINGE, AND FURNITURE ITEM HAVING SUCH A FURNITURE BOARD

Exemplary embodiments of the invention relate to a furniture board with an integrated or inserted hinge for guiding a movable furniture part, in particular a door. The furniture board has two side faces, an end face, and an end-face recess for receiving the hinge, wherein the hinge comprises a basic element, a linear guide and a pivot guide, and wherein the linear guide is hinged at a distance from the basic element. Exemplary embodiments of the invention further relate to an item of furniture having at least one furniture board with such an integrated or inserted hinge.

Furniture, for example kitchen furniture or living room furniture such as base or wall units, often have a furniture body open to the front, which can be closed by at least one door that is guided by hinges and can be pivoted around a vertical axis. The hinges are designed in such a way that the door performs a combined lifting and pivoting movement, which allows the door to be opened even if the furniture body is directly adjacent to another body which is also equipped with a front door or drawer front or other panel.

Usually the hinges are placed on an inner side wall of the furniture body. The door in turn is either connected to the hinge by a mounting plate or a so-called hinge cup is provided, which is fully or partially recessed into the door.

The combined lifting and pivoting movement of the door is achieved with the above-mentioned mounted hinges by means of a lever mechanism, wherein a 4-joint lever mechanism is often used or, for larger desired opening angles, also a 7-joint lever mechanism.

DE 20 2015 100 934 U1 discloses a hinge for a door having a linear guide and a pivot guide connected to it. The linear guide is arranged in a housing that can be inserted or integrated into a side panel of the furniture body. The linear guide displaces guide levers that are angled in a front area adjacent to the front of the side panel and project inwards into the body. At the end of these angled guide levers there are hinge axes to which levers of a pivot guide are hinged. When the hinge is closed, these levers dip into a hinge cup which is recessed into the furniture door.

Because the linear guide is integrated into the side panel, the hinge takes up less space inside the furniture body. However, parts of the hinge, here the angled guide levers of the linear guide when the hinge is closed, still protrude into the body. Accordingly, the side wall of the body has openings for the guide levers on its inside. This hinders the free design of the interior of the furniture.

DE 200 23 445 U1 discloses a so-called milled hinge for a door having a linear guide and a pivot guide connected to it. Here the linear guide is formed by the housing so that the linear guide has no other moving parts. The hinge can be inserted into a recess in a side wall of a furniture body, with the recess facing the inside of the body. The pivot guide has two crossed levers, one of which is pivotably hinged directly to the housing and the other is connected to the housing via the linear guide. Also with this hinge, the levers of the pivot guide exit the side wall through the opening of the recess on the inner side surface. This in turn hinders the free design of the interior of the furniture.

Exemplary embodiments of the present invention are directed to a furniture board for a furniture body or an item of furniture with an inserted or integrated hinge, allowing free design of the interior and preventing impacts on adjacent furniture fronts. Exemplary embodiments are also directed to an item of furniture having at least one hinge and the advantages mentioned.

A furniture board according to the invention is characterized in that the linear guide and the hinged connection of the pivot guide to the linear guide lie between a first and a second plane at least in a closed state of the hinge. The planes are defined by the two side surfaces of the furniture board as the planes in which the side surfaces of the furniture board (which are generally aligned parallel and spaced apart) are located. In other words, a projection of the hinged connection of the pivot guide is at least in the closed state and preferably over the entire range of movement of the hinge on the surface of the front side.

In the furniture board according to the invention, the combined lifting and pivoting movement of the connected movable furniture part, in particular a furniture door, is also achieved by a combination of linear guide and pivot guide. However, by moving the coupling between the pivot guide and the linear guide in front of the end face of the furniture board, the inner surface of the furniture board does not have to be interrupted by laterally protruding guide levers. Hinge points or hinge axes, at which the pivot guide is coupled to the linear guide, can be located inside the furniture board itself or also in an extension of the furniture board in front of the front face of the furniture board, for example, if a hinge cup is inserted, in which the hinge axes are then arranged. It is preferable for the two guides to be (permanently) coupled to each other in their sequence of movement, for example, to ensure that the pivoting movement during an opening process of the hinge does not begin until the linear guide has moved the hinge points of the pivot guide out of the furniture board to such an extent that pivoting can take place without collision. When the hinge is closed, this movement sequence should preferably be carried out in reverse order.

In advantageous embodiments of the furniture board, the linear guide has at least one movable slide and/or an adjusting mechanism that generates a lifting movement by means of pivoting levers. The linear guide can therefore be implemented in various ways, for example by means of the at least one movable slide, which is preferably guided within the basic element and which can be moved in a direction that is preferably perpendicular to the front side of the furniture board. In the second mentioned embodiment, a linear movement is realized in the form of a lifting movement by means of pivoting levers, wherein the levers are coupled together, for example in the manner of a lever hoist or scissor lift. A lever hoist may, for example, have four levers coupled by means of gear teeth, with hinge axes passing through two of the levers. Preferably, the coupled levers perform mirror-inverted synchronous pivoting movements in pairs.

In the context of the application, a linear guide is understood to be a guiding mechanism in which at least one element performs a guided linear movement. The fact that, in order to achieve the linear movement of that element, other elements perform pivoting or other movements does not deprive such a guide of the character of a linear guide according to the application.

In a preferred embodiment of the linear guide with displaceable slides, the linear guide comprises a first and a second slide, wherein the first slide is guided in a basic element of the hinge and the second slide is guided relative to the first slide. One of the displaceable hinge axes can be arranged on each of the slides, wherein the hinge axes form the joints of the pivot guide. In particular, if the two slides are coupled by a transmission gear unit with respect to their linear movement, the pivoting movement can be coupled to the linear movement in a mechanically simple and solid manner.

The transmission gear unit may, for example, comprise two coupled gearwheels or friction wheels mounted on a common axis of rotation on one of the slides, wherein a first of the gearwheels or friction wheels engages in a rack or runs on a running surface formed or arranged on the basic element, and a second of the gearwheels or friction wheels engages in a rack or runs on a running surface formed or arranged on the other slide. Such a transmission gear unit can be built up compactly and can therefore be easily integrated into a narrow basic element designed for installation in the furniture board.

Preferably, the linear guide has a slotted link guide for permanent coupling (also called positive coupling) with the pivot guide, wherein the slotted link guide comprises a control track, which can be designed as a cam guide or as a toothing.

In another advantageous embodiment of the furniture board, the pivot guide has at least two spaced apart hinge axes that form the connection to the linear guide. Alternatively, a pivot gear with a toothing at the pivot guide can be provided, wherein a coupling with the linear guide can be implemented via the pivot gear. The pivot guide can, for example, be designed as a 4-joint lever mechanism or comprise such a mechanism. The 4-joint lever mechanism can, for example, have a control lever which is designed as a two-sided lever and which engages in a slotted link guide formed on the sliding guide for permanent guidance.

In one embodiment, the pivot guide is formed in such a way that U-shaped bracket is guided through the hinge axes, around which a hinge cup is rotatably mounted. The pivot guide and the linear guide can be permanently coupled with respect to their movements by intermeshing gearwheels, in particular bevel gearwheels.

In a further advantageous embodiment of the furniture board, the hinge has a damping device for damping the closing and/or opening movement, wherein the damping device is designed as a linear damper or rotation damper. The damping device enables comfortable and material-friendly handling of a furniture item with the movable furniture part guided by the hinge of the furniture board. In order to achieve a smooth and easy movement of the furniture part, the damping device is preferably coupled at least temporarily to an element of the linear guide or the pivot guide.

Preferably, a (retracting) spring is also provided at the hinge, which acts on the linear guide and/or the coupled pivot guide in such a way that it generates a closing torque against the damping device in an effective range between the closed position and an open position of the hinge. In this way a safe closing of the hinge or the movable furniture part is achieved without a user having to move the furniture part manually until the final closing position. The effective range is preferably between 0° and 45°.

The preferred damping device is a linear damper and has a cylinder, a piston rod and a system for changing the flow cross-section, through which the piston rod exerts a damping force in one direction of movement, for example, and exerts almost no damping force in the other direction of movement. In a linear damper, a damping effect is usually produced in such a way that a viscous medium flows through a constriction during a movement of the piston rod in the cylinder. The system for changing the flow cross-section allows the damping effect to be made specifically dependent on the direction of movement of the piston rod and/or its relative position in the cylinder in order to achieve optimum damping over the entire desired range. The damping device can be spring-actuated to such an extent that the piston rod extends automatically, wherein the spring force is smaller than the force of a (retracting) spring.

In a further advantageous embodiment of the furniture board, the hinge has an adjusting device for positioning the movable furniture part in at least one spatial direction, wherein the adjusting device has a worm, an eccentric or a screw element. In this way, a guided furniture part can be easily aligned in its position relative to the body in order, for example, to achieve a high-quality appearance with, for example, uniform gap dimensions despite manufacturing tolerances. The adjustment device is preferably suitable for adjustment in several spatial directions in order to be able to optimally adjust gap dimensions in all directions.

In another advantageous embodiment, the furniture board has a material thickness of less than 25 mm (millimeters), preferably less than 21 mm. In particular, the basic element of the hinge has a thickness of less than 18 mm, preferably less than 16 mm. The hinge can thus be inserted into a furniture board with normal material thickness and usual proportions.

A furniture item according to the invention having at least one movable furniture part is characterized by a furniture board described above, which comprises an inserted or integrated hinge for guiding the movable furniture part. This results in the advantages mentioned in connection with the furniture board.

In an advantageous further development, the furniture board forms a vertical side wall and the guided movable furniture part is a door. If the movable furniture part is arranged next to another movable furniture part or next to a wall, it may preferably be provided that in the open state one end face of the movable furniture part covers at least part of the end face of the furniture board and/or a front face of an adjacent further movable furniture part.

BRIEF DESCRIPTION OF THE DRAWING FIGURES

Figure 2:
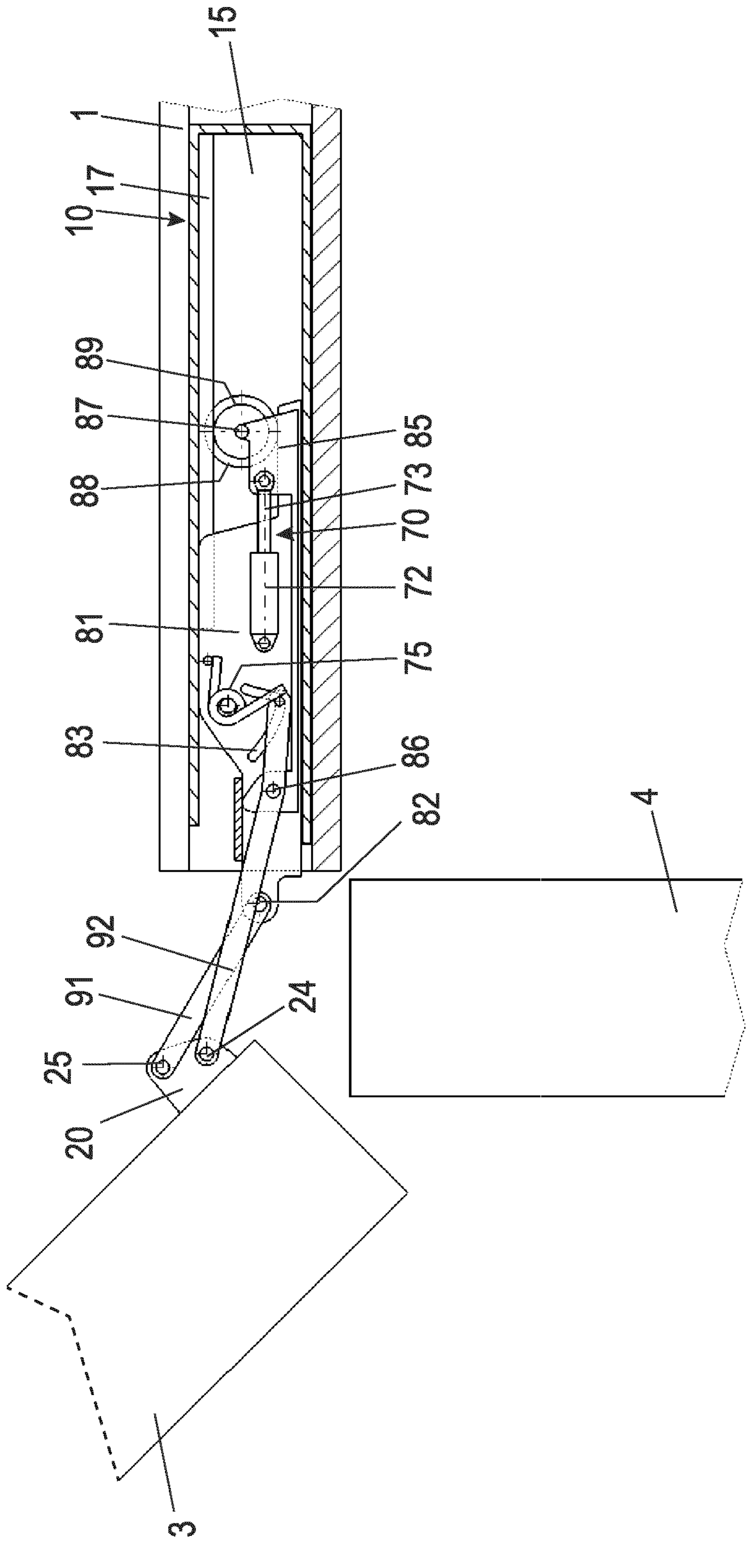
Figure 3:
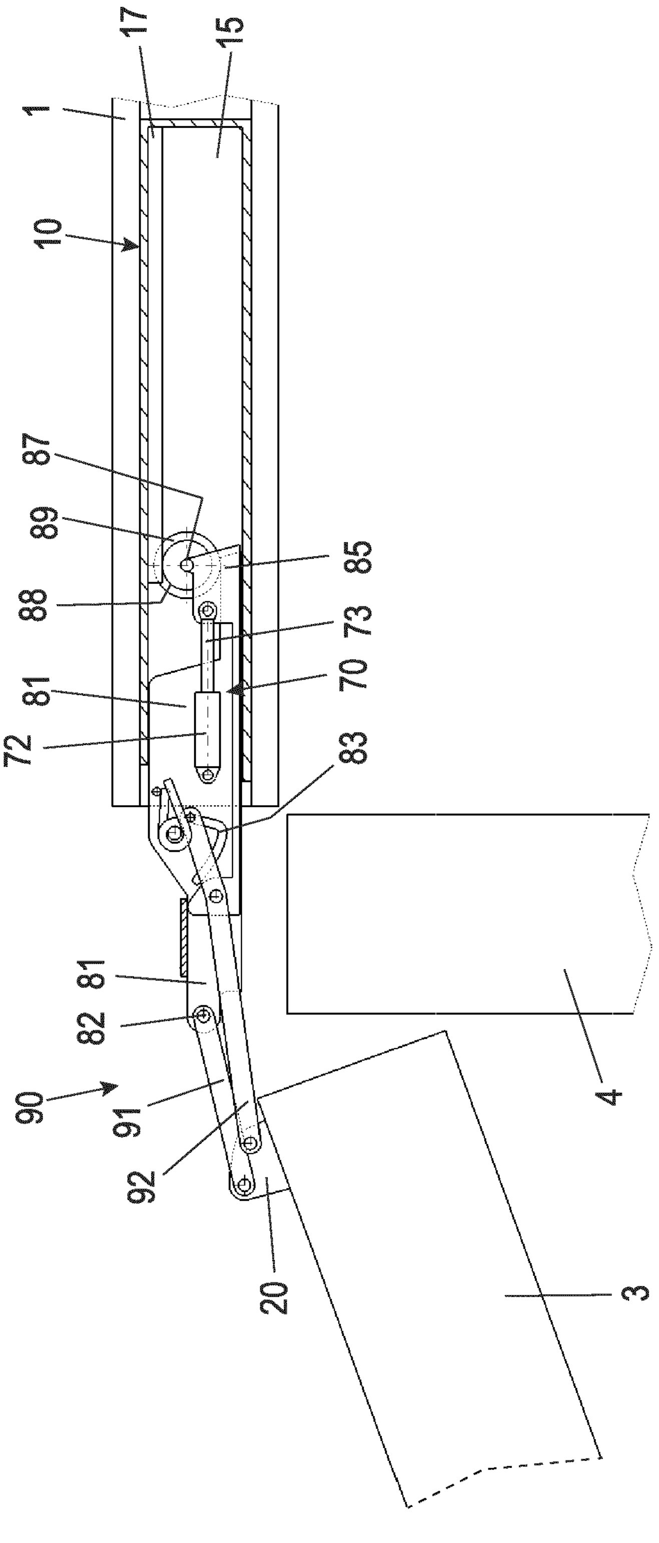
Figure 4:
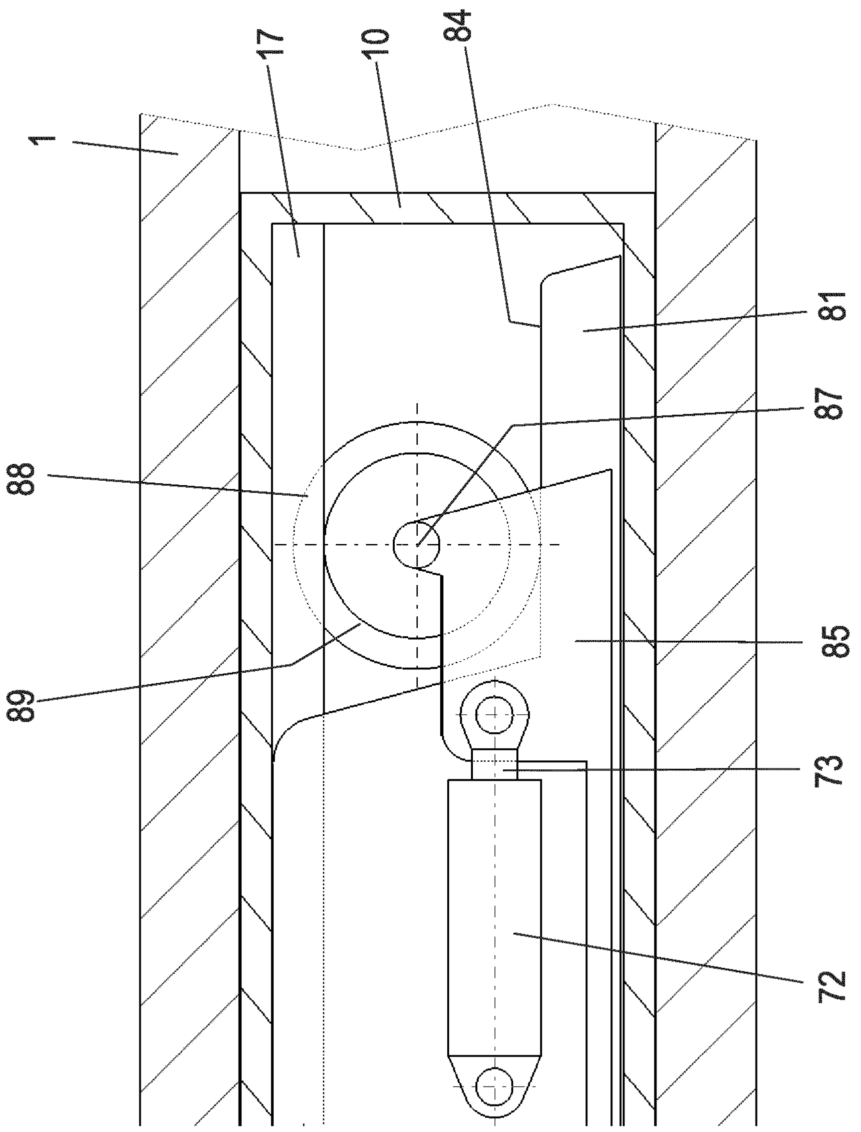
Figure 5:
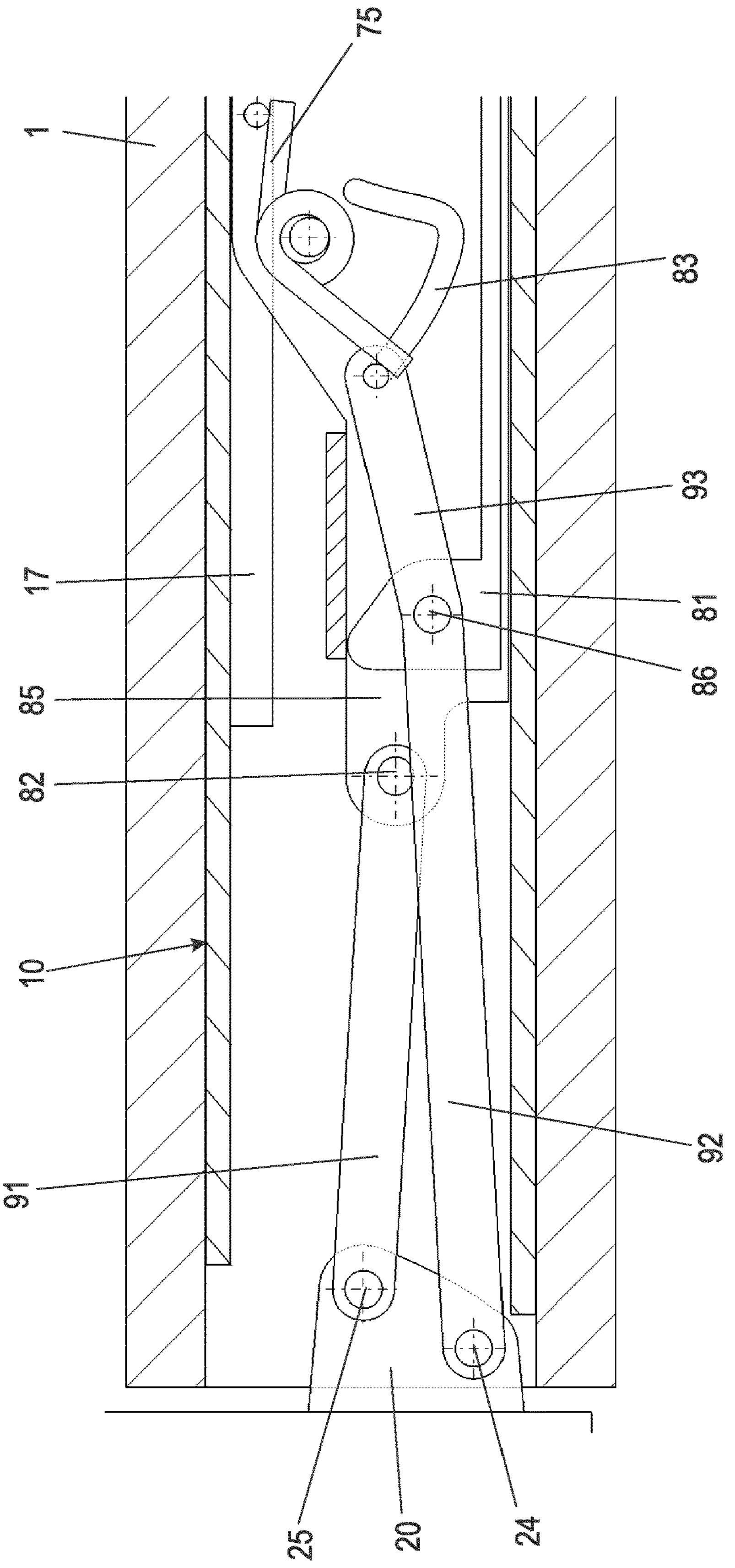
Figure 6A:
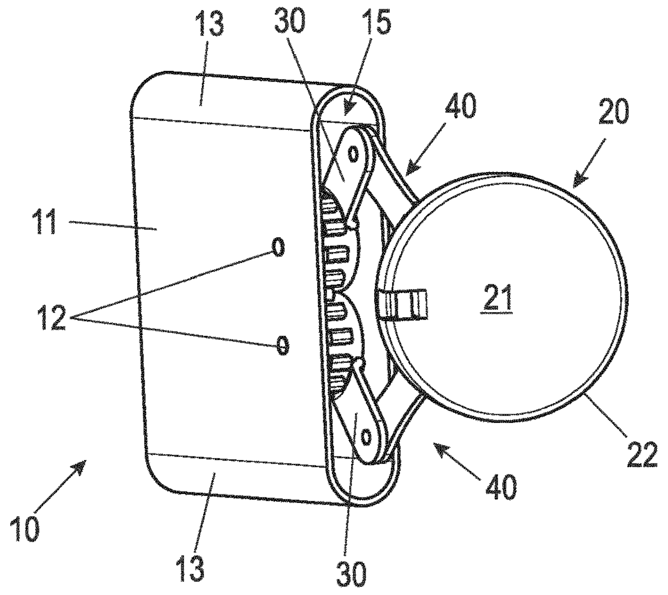
Figure 6B:
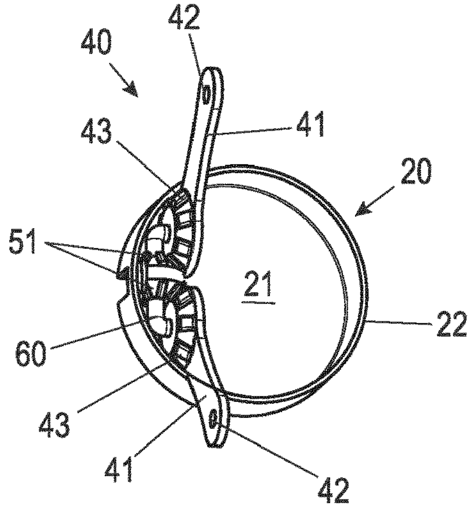
Figure 6C:
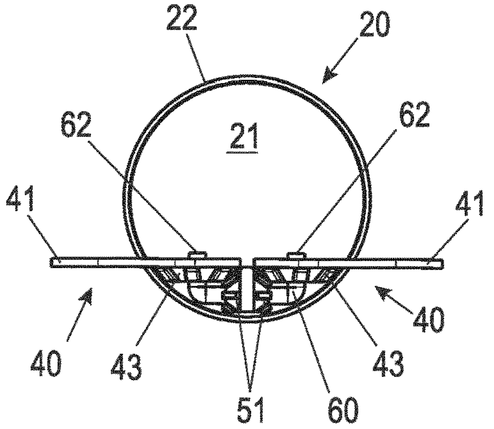
Figure 7A:
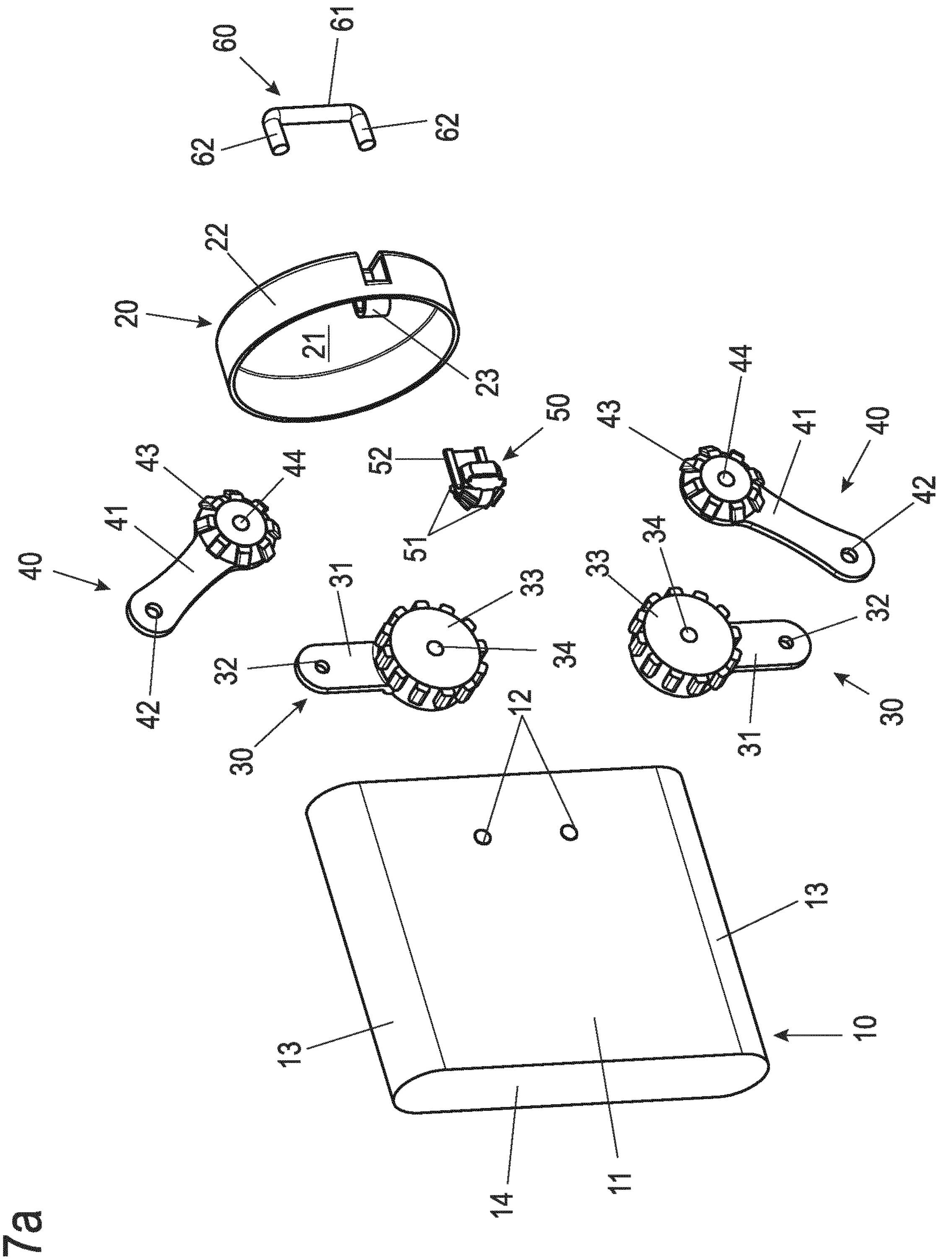
Figure 7B:
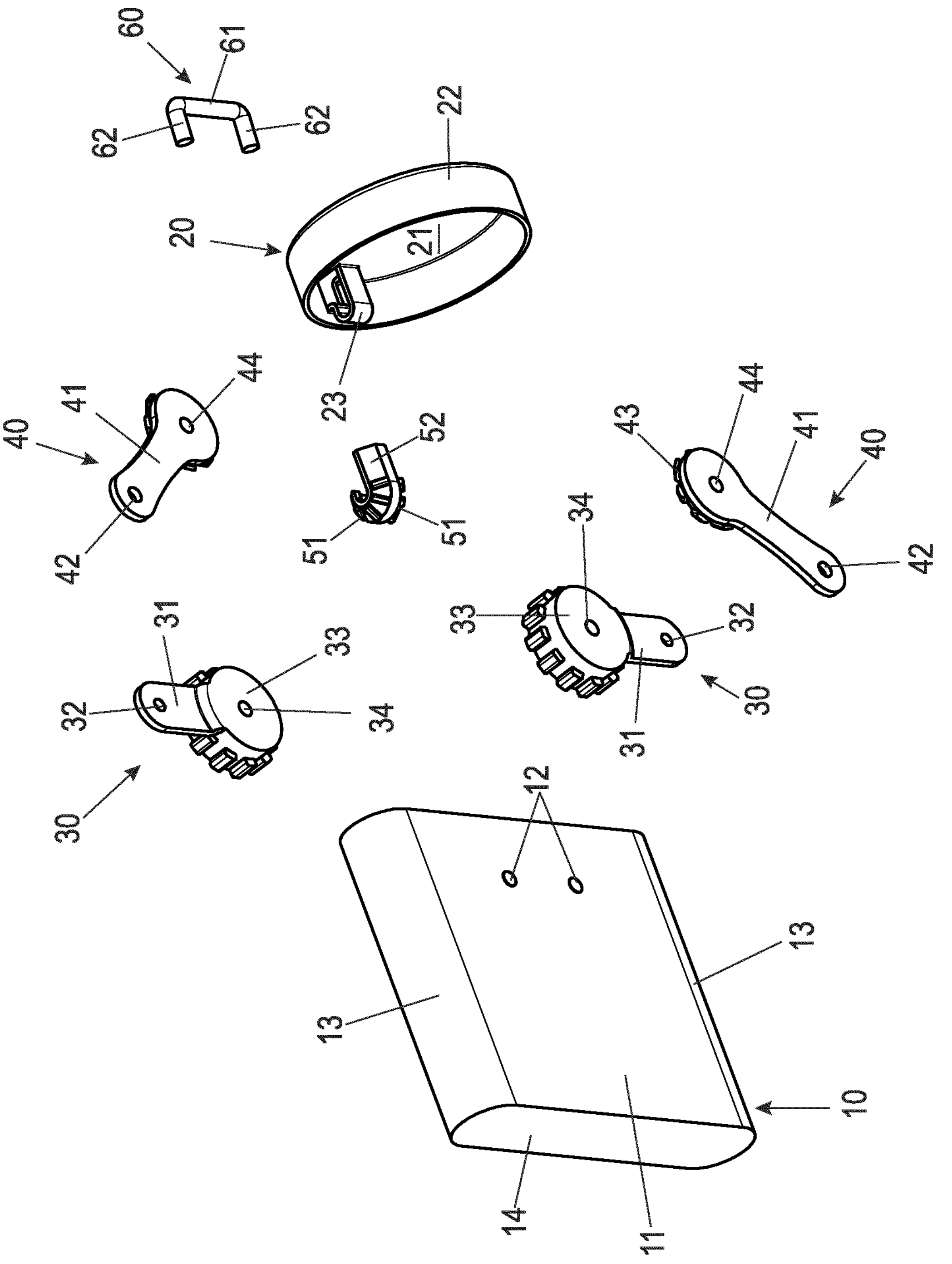
Figure 8A:
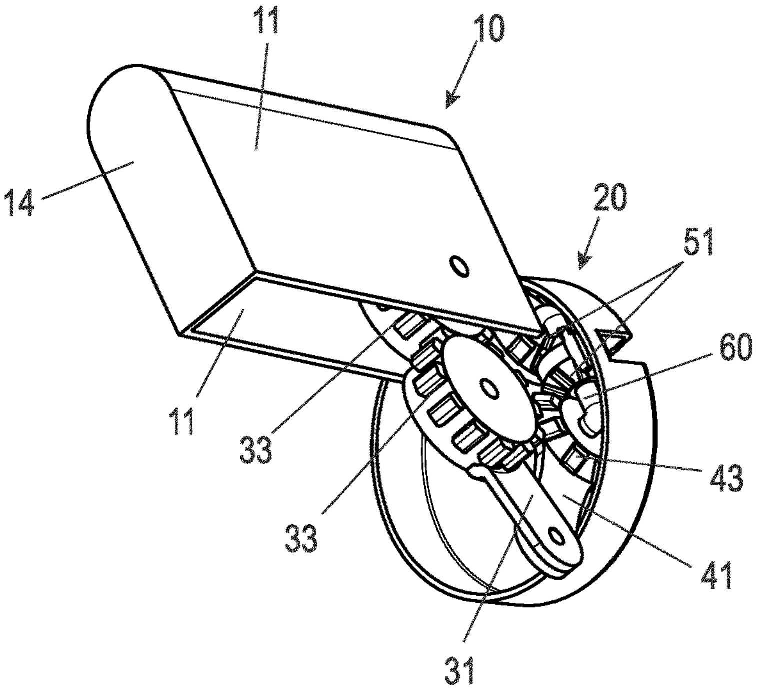
Figure 8B:
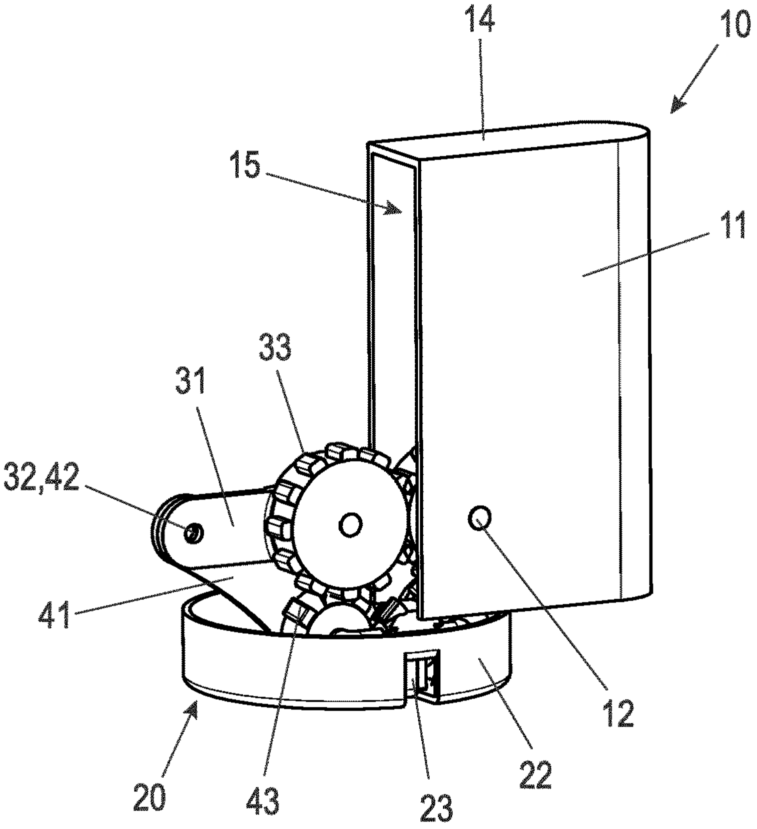
Figure 9A:
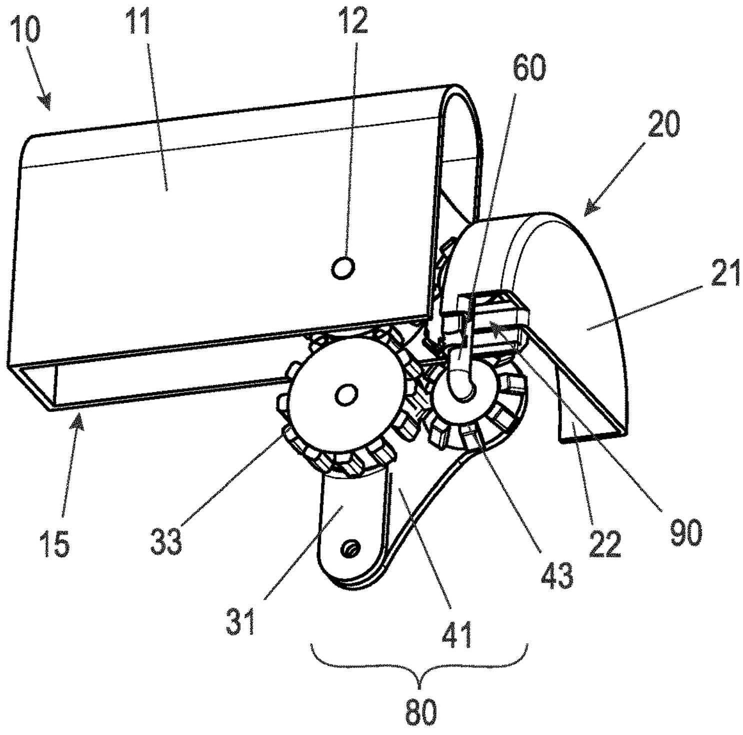
Figure 9B:
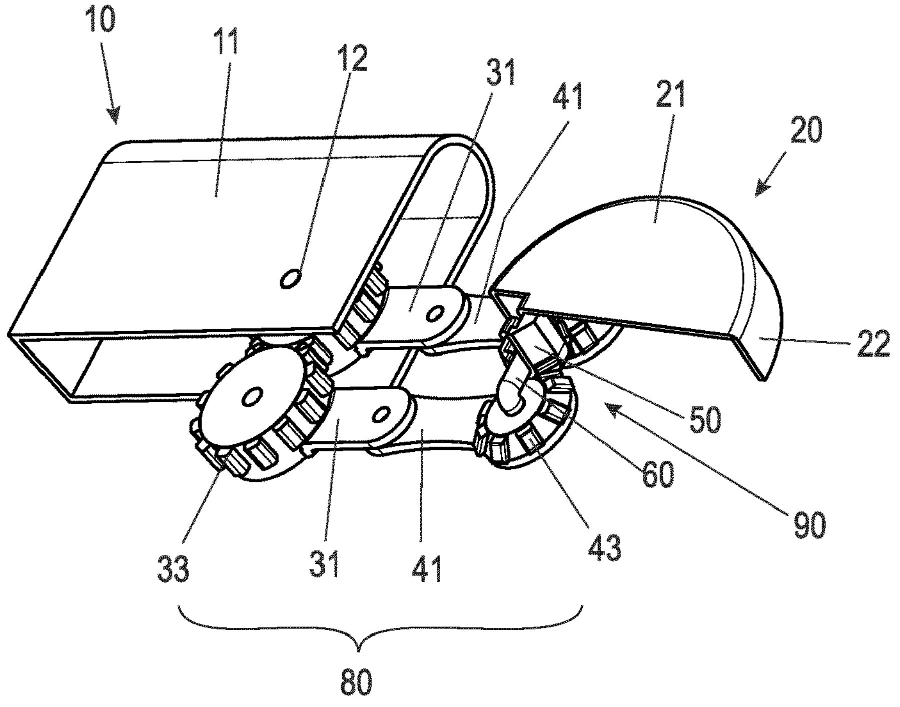
Figure 10A:
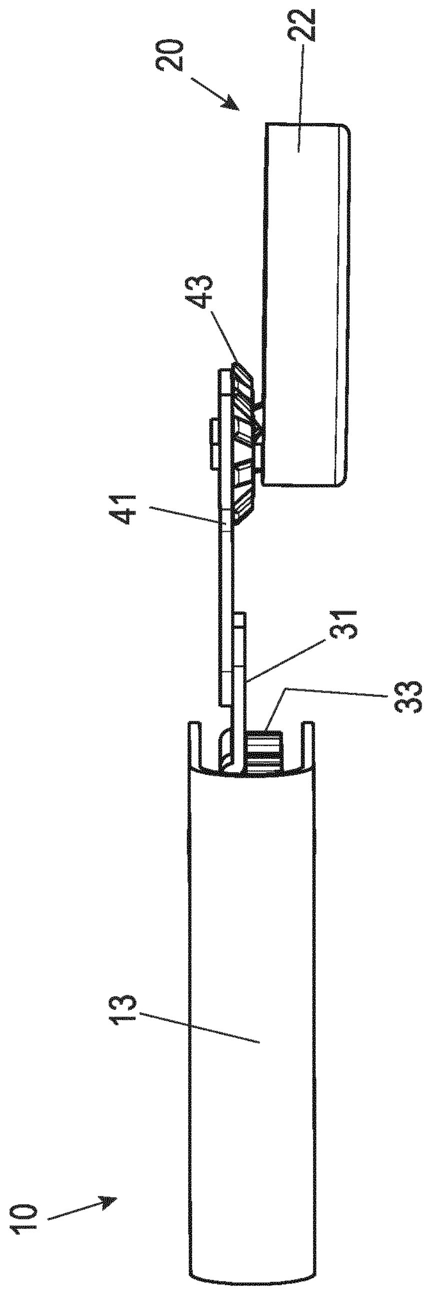
Figure 10B:
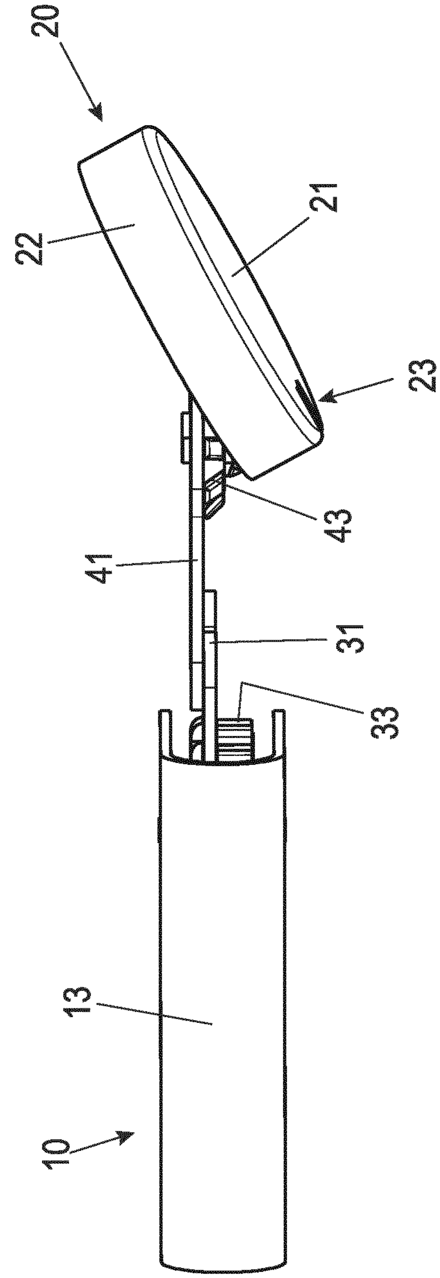
Figure 11:
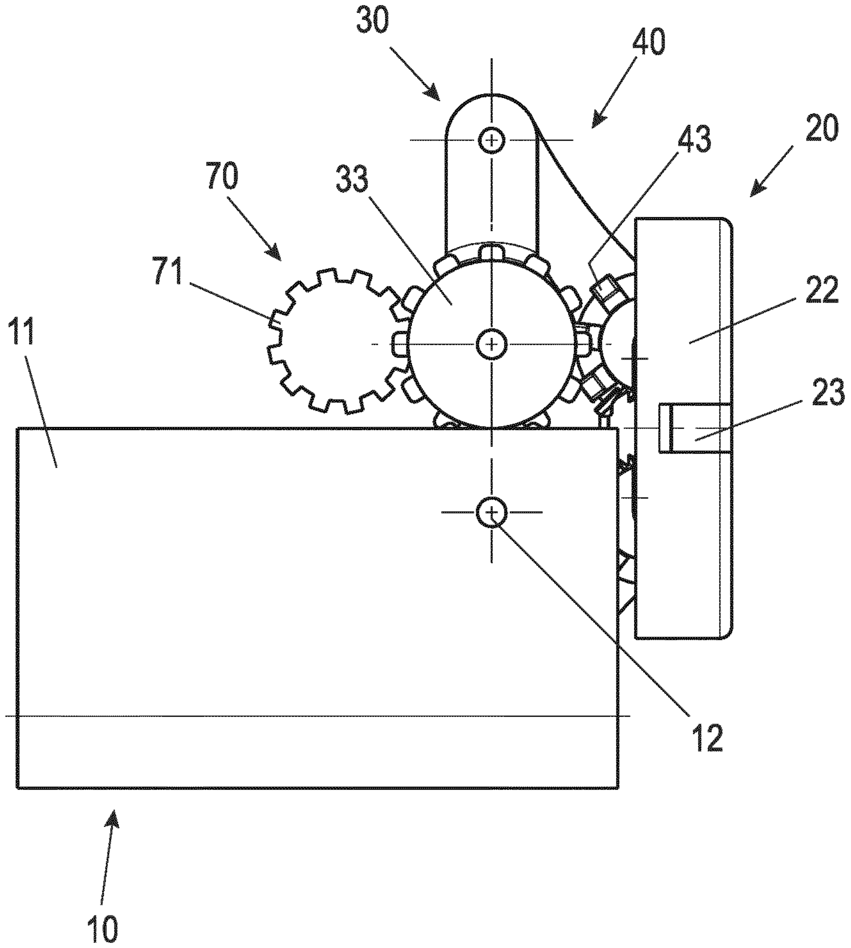
Figure 12A:
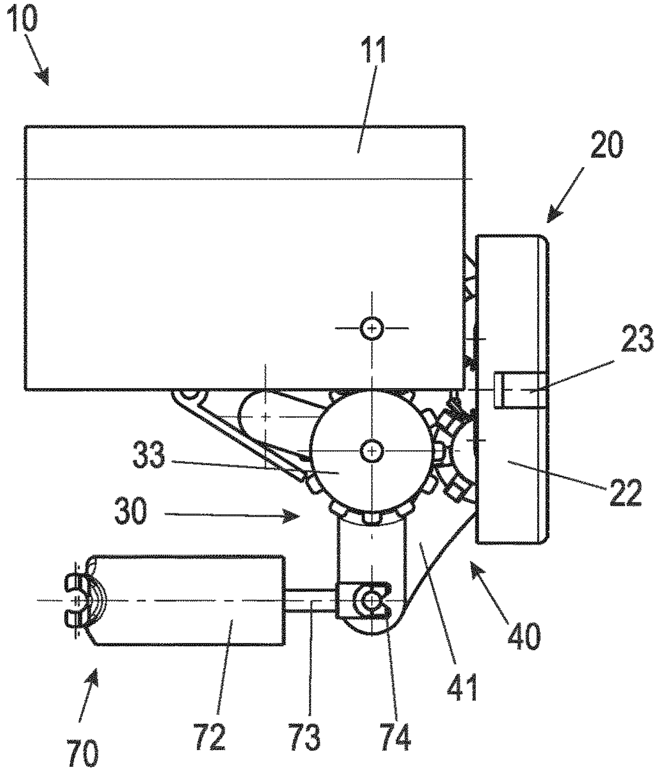
Figure 12B:
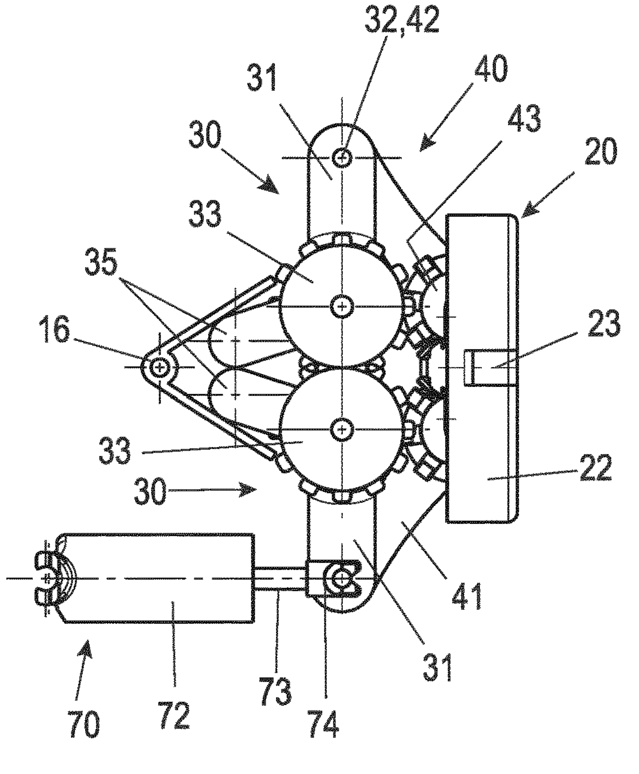

The invention is explained in more detail below by means of embodiment examples by reference to the figures, wherein:

FIGS. 1-3 each show a sectional view through a corner area of a furniture body with a hinge integrated in a side wall and a furniture door guided thereby in different opening positions of the furniture door;

FIGS. 4, 5 each show a detail of the hinge of FIGS. 1-3 in a detail enlargement;

FIG. 6*a* shows an isometric general view of another hinge for a furniture board in accordance with the application;

FIGS. 6*b*, 6*c* show two different views of a part of the hinge as shown in FIG. 6*a*;

FIGS. 7*a*, 7*b* each show an isometric exploded view of the hinge according to FIG. 6*a* in different directions of view;

FIGS. 8*a*, 8*b* show two different isometric views of the hinge as shown in FIG. 6*a*, each with part of the basic element removed;

FIGS. 9*a*, 9*b* show two different isometric views of the hinge as shown in FIG. 6*a*, wherein one part of the basic element and one part of the hinge cup are removed;

FIGS. 10*a*, 10*b* each show one side view of the hinge as shown in FIG. 6*a* in different opening positions; and FIG. 11 shows a side view of a modification of the hinge as shown in FIG. 6*a* with the basic element partially opened; and FIGS. 12*a*, 12*b* each show a side view of a further modification of the hinge as shown in FIG. 6*a* with partially opened (FIG. 7*a*) and completely removed (FIG. 7*b*) basic element.

DETAILED DESCRIPTION

FIGS. 1-5 show a first embodiment example of a furniture board with inserted or integrated hinge in accordance with the application. FIGS. 6*a*-12*b* show a second hinge that can be used in a furniture board according to the application in a similar way to FIGS. 1-3.

In all figures, identical reference numerals indicate identical or similarly acting elements. For reasons of clarity, not every element in all figures is marked with a reference numeral.

In the description, terms such as above, below, left, right refer exclusively to the exemplary representation chosen in the respective figures. The terms front and back usually refer to an orientation of the furniture body, with the front side indicating the open side of the furniture body that is usually facing the user.

FIGS. 1-3 shows a sectional view through a corner area of a furniture body with an integrated hinge. The furniture body has a side wall formed by a furniture board 1. To the front (in the figures to the left), the furniture board 1 and thus the side wall has a recess 2 at the front in which the hinge is inserted or integrated. The hinge serves to guide a movable furniture part 3, which in a closed position closes the furniture body open to the front. In the example shown, the movable furniture part 3 is a furniture door. In the following, the term furniture door 3 will also be used synonymously.

Furthermore, the figures show a furniture front 4 of a neighboring furniture body, which is otherwise not shown in further detail. Furniture front 4 can, for example, also be formed by another furniture door, but also by a fixed front panel or a front panel mounted on a drawer.

FIG. 1 shows the furniture door 3 and thus the hinge in a closed position (hereinafter also referred to as the closed position). FIG. 2 shows a partially open position of furniture door 3 or the hinge with an opening angle of approximately 45 degrees. Finally, FIG. 3 shows a fully open position in which furniture door 3 or the hinge in this example has an opening angle of approximately 110 degrees. The comparison of the three figures shows that the furniture door 3 performs a combined lifting and pivoting movement by which the furniture door 3 is pivoted in front of the furniture front 4 in the partially open or fully open position.

The side wall is formed from the furniture board 1 according to the application, in which the hinge shown is inserted or integrated. Furniture board 1 can have several of the hinges shown in an alignment along the front side of the side wall, so that the mounted furniture door 3 is guided by two or three of the hinges shown, for example. In the furniture board 1, recess 2 is provided to accommodate the hinge from the end face. This can be done subsequently by means of a corresponding milled recess, but it is also conceivable that the furniture board 1 is already manufactured with the inserted hinge by forming it from a core and two cover panels, wherein the core has the corresponding recess in the area shown and the core together with the hinge or hinges is connected to the cover panels, for example by gluing.

The hinge with a basic element 10 is inserted into the end-face recess 2, wherein the basic element 10 is connected to the furniture board 1, in this case the side wall. This connection can be made, for example, by gluing and/or screwing, in particular through the end-face recess 2 into the core located behind the hinge. Furthermore, a quick-fastening system can be provided for the connection, for example with a snap-in or clip-in mechanism.

The basic element 10 of the hinge is formed in an essentially cuboid manner and open at least to the front side, so that components of the hinge can protrude through this opening and the opening of the end-face recess 2 of the side wall. A linear guide 80 is arranged in the basic element 10, which is coupled with a pivot guide 90, which in turn is attached to a mounting element 20, to which the movable furniture part 3, in this case the furniture door, is mounted.

In the present embodiment example, the linear guide 80 has two movable slides, specifically an outer slide 81, which is displaceably guided in the basic element 10, and an inner slide 85, which is movable relative to the outer slide 81 and is displaceably guided in this outer slide 81. The outer slide 81 and the inner slide 85 can, for example, each be formed as a U-shaped element, for example from stamped and embossed sheet metal. The two slides 81, 85 are arranged nested within each other so that the outer slide 81 slides for guidance along surfaces of the basic element 10 and the inner slide 85 slides for guidance along surfaces of the outer slide 81. The movement takes place in horizontal direction, i.e., in the plane of the sheets of the figures shown. With respect to the furniture body, the linear guide 80 moves forward or backward. To make it easier to see the contours of the inner slide 85, its boundary lines are not drawn as hidden lines.

In the embodiment example shown, the movement of the two slides 81, 85 is permanently coupled by a transmission gear unit. This is achieved with the aid of two gearwheels, a first gearwheel 88 and a second gearwheel 89 which is connected to it in a rotationally fixed manner. Both gearwheels are rotatably supported by means of a common pivot bearing 87, wherein the pivot bearing 87 is formed on the inner slide 85. The first gearwheel 88 has a larger diameter and engages in a toothing (rack) formed on the corresponding inner side of the basic element 10. The second gearwheel 89 meshes with a toothing, here formed by a rack 84, which is formed on the outer slide 81. The coupling of the two slides 81, 85 is shown again in detail in FIG. 4 in an enlarged sectional view. It should be noted that the diameter ratio of the first and second gearwheel 88, 89 in the figures shown is schematic and purely exemplary and does not quantitatively reflect the transmission ratio.

The permanent coupling of the slides 81, 85 can be clearly seen in the comparison of FIG. 1-3 at the different opening states of the hinge. When the linear guide moves forward to open the end-face recess 2, the inner slide 85 covers a greater distance relative to the basic element 10 than the outer slide 81.

In the respective front area of the outer or inner slide 81, 85, hinge axes 82, 86 are arranged, to which levers of the pivot guide 90 are connected. Specifically, a support lever 91 is pivotally connected to the hinge axis 82 of the outer slide 81 and a control lever 93 is connected to the hinge axis 86 of the inner slide 85.

Both levers are pivotably hinged at a free end with hinge points 24, 25 to the mounting element 20. In the embodiment example shown, the mounting element 20 is a mounting plate (not visible here) having a lug projecting vertically from it, wherein the hinge points 24, 25 are arranged on this projecting lug. The two levers, the control lever 93 and the support lever 91, together with the respective hinge axes 82, 86 or the hinge points 24, 25 form a 4-joint hinge, with which a pivoting movement of the furniture door 3 is possible.

In the closed position of the hinge, shown in FIG. 1, the linear guide 80 is retracted as far as possible into the basic element 10. The control lever 93 and support lever 91 are also completely retracted into the end-face recess 2 of the furniture board 1 and also essentially completely into the basic element 10. Both levers are aligned almost parallel to each other and extend essentially in the direction of the furniture board 1. The lug of the mounting element 20 is also positioned within the end-face recess 2, so that the hinge points 24, 25 are also located in the area of the furniture board 1. In order to provide more space for the lug of mounting element 20 at this point, the basic element 10 of the hinge is not guided to the edge of the end-face recess 2. In alternative embodiments, however, this would also be conceivable. It is also possible that the side wall has a recess on the side wall so that the movable hinge parts can also use this space, wherein the movable hinge parts do not protrude into the furniture when closed.

When furniture door 3 is opened, for example to the position shown in FIG. 2, on the one hand the linear guide 80 moves forward within the furniture board 1 and thus the side wall, and on the other hand the levers 91, 93 pivot relative to the linear guide and also relative to the mounting element. The movement of the linear guide 80, specifically the outer slide 81 and the inner slide 85, is coupled with the pivoting of the levers 91, 93. This is achieved in that one of the levers, in this case the control lever 93, is designed as a two-sided lever and protrudes with a control lever arm 92 beyond the hinge axis 86. The control lever 93 is formed in a slightly cranked manner. At the free end of the control lever arm 92 there is a pin which is guided in a slot-like slotted link guide 83 which is formed on the outer slide 81.

The opening movement of furniture door 3 causes a linear movement of linear guide 80 due to the interaction of control lever 93 or control lever arm 92 in the slotted link guide 83. The coupling of the movement of the outer slide and the inner slide 81, 85 in turn causes the pivoting dynamics of the pivot guide 90, so that overall the illustrated movement sequence of furniture door 3 is forced. The final state of the opening movement is shown in FIG. 3. In this state, the linear guide 80 is extended to the maximum, whereby the hinge axes 82, 86 are pushed out to the front side of the furniture board 1. However, they are still in the plane of the furniture board 1, i.e., in a projection onto the front of the furniture body, the hinge axes 82, 86 are located in the area of the front side of the furniture board 1 and thus also the side wall. When furniture door 3 is closed, the pivoting and sliding movement runs backwards again accordingly until the state shown in FIG. 1 is reached.

The coupling of the linear and the pivoting movement by the slotted link guide 83 is shown in FIG. 5, enlarged once again. For the sake of clarity, FIG. 5 does not show elements of the self-closing and damping function described below.

To achieve end position damping, a damping device 70 is also provided. In the example shown, the damping device 70 is designed as a linear damper with a cylinder 72 and a piston with piston rod 73 moving in this cylinder. In the embodiment example shown, the linear damper engages between the outer slide 81 and the inner slide 85 and thus dampens, at least in sections, a movement of the two slides 81, 85 relative to each other. The damping device 70 can, for example, be designed in such a way that damping of the movement of the two slides 81, 85 towards each other takes place when the hinge moves in the direction of the closed end position (FIG. 1). In this way a closing damping is achieved.

In addition, a self-closing function is provided, which in the present case is realized by means of a spring 75, realized here as a spiral spring. The spring is arranged on the outer slide 81. One of two spring arms, which are sprung against each other, is supported by a pin that is inserted in the outer slide 81. The second of the mentioned spring arms acts on the control lever arm 93. In this way, self-closing in the closed position is achieved.

The figures described below show further examples of a furniture hinge suitable for integration into a furniture board in accordance with the application, for example furniture board 1 shown in the first embodiment example in FIGS. 1 to 5.

FIG. 6*a* first shows an isometric view of another example of a furniture hinge in an assembled state in a central open position. Central opening position means that a furniture part guided by the furniture hinge, in particular a furniture door, is in an angular range between a closed state, in which the door rests with its free edge against the furniture body, and an open position, in which the door has an opening angle of e.g. 90° compared to the closed position.

The furniture hinge has a basic element 10, which is connected to a mounting element 20 via a lever mechanism. A furniture door, for example, is mounted on the mounting element 20. The mounting element 20 is designed as a hinge cup and is therefore also referred to as hinge cup 20 in the following. The lever mechanism comprises two levers 40 linked to the hinge cup 20 and two further levers 30 linked to the basic element 10.

The basic element 10 is approximately cuboid or case-shaped and has two parallel side panels 11, which are connected at their side edges by rounded transverse sides 13. In the installation position of the furniture hinge, these transverse sides 13 are at the top and bottom respectively. In the installation position to the front (in FIG. 6*a* to the right) the basic element 10 is open, whereas to the rear (not visible in FIG. 6*a*) a rear side 14 preferably closes the basic element 1. This rear side 14 is clearly visible, for example, in FIGS. 7*a* and 7*b*, which show isometric exploded drawings of the furniture hinge.

The case-shaped basic element 10 provides a cavity 15 in which a part of the hinge mechanism explained below is located. The side panels 11 are preferably only spaced apart so far that the basic element 10 can be inserted into a pocket-shaped recess at the front of a furniture board, which forms, for example, a side wall of a furniture body. The pocket, which is preferably milled in from the end face, has a shape corresponding to the outer contours of the basic element 1 due to the tool. This basic element 10 can thus be inserted flush on all sides and thus well anchored in the side panel of the furniture body and can be glued and/or fastened there, for example, with the aid of screws that are screwed through the rear side 14 into the material of the side panel of the furniture body. The basic element 10 can, for example, be made of appropriately punched sheet metal in rolled form. In a further embodiment, the basic element 10 can have fastening webs that are suitable for fastening the basic element 10 at the front side by means of screws or other fastening systems. For example, a snap-on fastening, e.g., clipping in, can also be implemented.

In both side panels 11 of the basic element 10, holes 12 are arranged in the front middle area, which accommodate a bearing bolt (not shown here) and thus serve as bearing points. The bearing bolts pass through the two further levers

30, which are thus mounted in the basic element 10 so that they can be rotated about a horizontal axis (in the installation position of the furniture hinge).

The further levers 30 are clearly visible in FIGS. 7*a* and 7*b*. They each comprise a lever arm 31, which has a hinge hole 32 at one free end. At the opposite end, a gearwheel 33 is non-rotatably coupled to the lever arm 31. In the embodiment example shown, the lever 31 is formed in a slightly offset manner and enlarged like a plate at its free end. The gearwheel 33 is mounted on this plate. It should be noted that in alternative embodiments, a toothing provided by the gearwheel 33 can also be formed integrally with the lever arm 31. Another hinge hole 34 extends centrally through the gearwheel 33.

With these additional hinge holes 34, the further levers 30 are pivoted on the bearing bolts, which are guided by the side panels 11. The distance between the holes 12 in the side panels 11 is selected so that the two gearwheels 33 of the further levers engage in each other, whereby the further levers 30 perform a coordinated pivoting movement mirror-inverted to a central axis of the basic element 10. The pivoting movement of the further levers 30 is rotated by 90° to the rotary movement of the furniture door 3, so that a scissor lift is created here. The pivoting movement of the further levers 30 is responsible for the linear movement and thus the further levers 30 form part of the linear guide 80 (see FIGS. 9*a*, 9*b*).

The free ends of the further levers 30 are coupled in the other hinge holes 32 with comparable free ends of the levers 40. These levers 40 are supported at their respective further ends in the hinge cup 20.

The arrangement and bearing of the levers 40 in the hinge cup 20 can be clearly seen in FIGS. 6*b* and 6*c*, which show an isometric view or a top view of the hinge cup 20 with inserted levers 40 separately from the basic element 10 and the further levers 30. The hinge cup 20 has a base 21 and an edge 22 and is inserted in the known manner into a cup hole of the furniture door to be guided. It can be glued there or fastening elements can be formed along the edge 22, with which a clamping, latching, screwing and/or bracing of the hinge cup 20 in the cup hole takes place.

The design of lever 40 is again clearly visible in FIGS. 7*a* and 7*b*. They are similar in design to the further levers 30 and have a lever arm 41 with a hinge hole 42 at one end and a toothing at the opposite end. The toothing here is formed by a fitted bevel gearwheel 43. A further hinge hole 44 leads again centrally through the bevel gearwheel 43.

In the hinge cup 20, the two levers 40 are rotatably mounted by placing them with their other hinge holes on leg 62 of a bearing bracket 60. The bearing bracket 60, in turn, is fixed in the hinge cup 20 with a base 61 so that it can pivot around said base 61. For this purpose, a bracket attachment 23 is formed at a point on edge 22, into which the bearing bracket 60 is inserted. The two legs 62 of the bearing bracket 60 thus form pivotable axes around which the levers 40 can be pivoted. When the furniture hinge is in the closed position, the alignment of the legs 62 and thus of the bearing or pivot axes of the levers 40 is parallel to the base 21 of the hinge cup. A pivot guide 90 is formed by the pivotable bearing of the bearing bracket 60 in the hinge cup 20 (see FIGS. 9*a*, 9*b*).

In the embodiment example shown, the hinge cup 20 is formed from a metal sheet in a punching and bending process. The bracket attachment 23 can be easily punched out of the edge 22 and turned inwards. The hinge cup 20 is thus formed in one piece including the bracket attachment 23. In alternative embodiments, the hinge cup 20 can also be made of plastic in an injection molding process, preferably also in one piece.

The hinge cup 20 has a toothing 51 in the area of the bracket attachment 23, which is in engagement with the bevel gearwheels 43 of both second levers 40. In the embodiment example shown, toothing 51 is provided by a tooth insert 50, which in turn is clearly visible in FIGS. 7*a* and 7*b*. The toothing 51 has two sections of a bevel gearwheel facing away from each other as well as an adjoining insertion lug 52, which is inserted into a corresponding recess in the area of the bracket attachment 23 and fixes the tooth insert 50 to the hinge cup 20. In one embodiment example of the hinge cup 20, in which this is manufactured as an injection molded part, the toothing 51 can also be formed directly on the hinge cup 20.

The two levers 40 are coupled to each other via the toothing 51 of the tooth insert 50 in such a way that, similar to the further levers 30, they can only perform synchronous pivoting movements in mirror image with respect to a vertical center plane. During this pivoting movement, the bevel gearwheels 43 roll on toothing 51, causing the hinge cup 20 to pivot about the base 61 of the bearing bracket 60 relative to the plane in which the levers 40 are located.

In the assembled state of the furniture hinge, the free ends of the further levers 30 and levers 40, which are opposite the respective toothing, are connected in pairs. For this purpose, bearing bolts or rivets pass through the hinge hole 32 and 42 respectively. The further levers 30 and the levers 40 jointly form the linear guide 80.

The motion sequence of the furniture hinge is explained in more detail below using FIGS. 8*a*, 8*b*, 9*a*, 9*b*, 10*a* and 10*b*.

FIGS. 8*a* and 8*b* show the assembled furniture hinge in two isometric representations from different viewing directions. For a better overview, only one half of the basic element 10 is shown.

In FIGS. 8*a* and 8*b*, the furniture hinge is initially shown in the closed state, i.e., with the furniture door adjacent. In this state the hinge cup 20 lies with its edge 22 against the basic element 10. The further levers 30 are completely pivoted into the cavity 15 of the basic element.

FIG. 9*a* also shows the closed state of the furniture hinge, wherein in this illustration the hinge cup 20 is also shown halved.

Opening the furniture door, i.e., pivoting the hinge cup 20, causes the toothing 51 of the hinge cup 20 to roll off on the bevel gearwheels 43, whereupon the levers 40 pivot towards each other from the position shown in FIG. 9*a*. By connecting the further levers 30 to the levers 40, this pivoting of the levers 40 towards each other is accompanied by a synchronous pivoting of the further levers 30 towards each other. This in turn kinematically causes an extension and thus a linear guide 80 of the lever mechanism, wherein the bearing bracket 60 and thus the hinge cup 20 moves linearly away from the basic element 10.

FIG. 9*b* shows the opening state of the furniture hinge, for example with an opening angle of 90° compared to the closed position. In this state, the further interconnected levers 30 and the lever 40 form a stretched arrangement in pairs, correspondingly the hinge cup 20 and the furniture door it holds are moved linearly from the side panel of the body towards the room.

The furniture hinge shown therefore performs a combined pivoting movement through the pivot guide 90 of the hinge cup 20 with a linear movement through the linear guide 80. The linear movement moves the corresponding furniture door so that its side edge moves in front of a front side of an adjacent furniture door when viewed from the user's direction, so that the two doors do not collide when opened. As in the first example shown in FIGS. 1 to 5, the hinge axes of the linear guide—the legs 62 of bracket 60—move so that they move over the entire range of movement between the planes defined by the side faces of the furniture board. The pivot axis of the pivot guide 90, the base 61 of the bracket 60, is located in front of the front face of the furniture board over the entire range of movement of the hinge, or in other words, the projection of the pivot axis is located on the surface of the front face in any opening state of the hinge.

FIGS. 10*a* and 10*b* show the furniture hinge in a side view with a view of the transverse sides 13 of the basic element 10. FIG. 10*a* shows the open position of the furniture hinge and FIG. 10*b* shows a slightly closed position in which the hinge cup 20 is tilted and minimally retracted.

As a result of the lever kinematics, linear and pivoting movements of the cup 20 are coupled, but not linear to each other. Starting from the open position, in which the lever mechanism is stretched, a pivoting movement of the hinge cup 20 initially leads to a small linear movement. As the cup approaches the closed position, the linear movement becomes increasingly larger in relation to a change in angle. This results in an approximately sinusoidal functional relationship. This is advantageous because, conversely, starting from the closed position, an initially smaller pivoting movement of the hinge cup 20 already leads to a significant extension of the furniture door, so that with the continued pivoting movement of the hinge cup 20 the furniture door is already extended far enough so that it does not collide with the adjacent furniture door.

In the embodiment example shown, both the levers 40 and the further levers 30 are coupled to each other by the toothings in such a way that they perform the same pivoting movements in mirror image in each case. The mirror-inverted pivoting movement that the levers 30, 40 carry out relative to the linear guide 80 can also be implemented in principle if only the two levers 40 are coupled together by their toothing, in the example the bevel gearwheels 43. However, the coupling of both pairs of levers results in a more loadable guide.

FIGS. 11 and 12*a, b* show two further embodiment examples of a furniture hinge according to the application in side view. Identical reference numerals indicate in these figures the same or similarly acting elements as in the previous figures.

In its basic construction the hinges shown in FIGS. 11 and 12*a, b* correspond to the example shown in FIGS. 6*a* to 10*b*. Explicit reference is hereby made to the corresponding description.

The hinges shown in FIGS. 11 and 12*a, b* each represent a further development of the hinge of the previous example. Specifically, the hinge of the previous example is supplemented by a damping and/or self-closing function.

In the example in FIG. 11, a damping device 70 is provided for this purpose, which is designed as a rotational damper. The damping device 70 has a circumferential gear rim 71 which engages in the gearwheel 33 of one of the further levers 30. When the hinge is pivoted out, the further lever 30 pivots, whereby the (rotational) damper is rotated and dampens the pivoting movement. The damper can be designed in such a way that only certain sections of the rotational movement are damped, so that the hinge is damped when approaching the closed and/or fully open end position. Furthermore, the damper can be combined with a spring, for example a spiral spring, so that the further lever 30 is preloaded in a pivoting direction, for example in the direction of the closed end position of the hinge cup 20. A combined self-closing and damping function can thus be implemented.

Since the movement of both further levers 30 is coupled in the furniture hinge shown, it is basically sufficient to provide such a damping device 70, which acts on the gearwheel 33 of the further lever 30. However, it would also be possible to provide two such damping devices 70 to amplify the damping forces.

FIGS. 12*a* and 12*b* show a further embodiment example with a damping device 70. In the example of FIG. 12*a,* similar to the example of FIG. 11, only half of the basic element 10 is shown, whereas in the embodiment example of FIG. 12*b* it is completely removed to give an insight into the inner structure of the hinge.

In contrast to the embodiment example in FIG. 11, here the damping device 70 is formed by a linear damper comprising a cylinder 72 with a piston and a piston rod 73. A clevis 74 is arranged is arranged at the end of the piston rod, with which the piston rod 73 is coupled to the lever mechanism of the hinge. The cylinder 72 of the damping device 70 is pivotably mounted on the basic element 10, for example by means of a bolt or rivet passing through the side panels 11 of the basic element 10.

In the example shown, the clevis 74 engages at the connection of lever arms 31 and 41 of the further lever 30 or lever 40 and thus dampens a pivoting movement of these lever arms 31,41. In alternative embodiments, other points of engagement of clevis 74 at lever arm 31 are conceivable. The damping device 70 dampens a pivoting movement of the further lever 30 when the hinge approaches the closed end position.

The embodiment example of FIGS. 12*a* and 12*b* also includes a self-retracting function which, unlike the example in FIG. 11, is not integrated in the damping device 70 but in the further levers 30. In this example, both further levers 30 are provided with a retracting spring. However, it would also be conceivable to allow a retracting spring to act only on one of the further levers 30. The springs themselves cannot be seen in FIGS. 12*a,* 12*b,* they are arranged, for example, as spiral springs below the gearwheels 33. The ends of the springs, which are supported on the basic element 10, are shown as lugs 35 in the figures. A retaining clip 16, which is attached to one or both side panels 11, fixes the lugs 35 in the position shown. It is also possible to form the retaining clip 16 in a spring-loaded manner so that it forms a draw-in spring which acts on the two further levers 30 by pressing the ends of the two further levers 30 towards each other.

In this example too, two damping devices 70 can be provided to achieve greater damping forces, which then act independently of each other on one of the further levers 30.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Furniture board
2 End-face recess
3 Movable furniture part (furniture door)
4 Furniture front
10 Basic element
11 Side panel
12 Bore (bearing position)
13 Transverse side
14 Rear side
15 Cavity
16 Retaining clip (spring)
20 Mounting element (hinge cup)
21 Base
22 Edge
23 Bracket attachment
24 Hinge point
25 Hinge point
30 Further lever
31 Lever arm
32 Hinge hole
33 Gearwheel
34 Hinge hole
35 Lug
40 Lever
41 Lever arm
42 Hinge hole
43 Bevel gearwheel
44 Further hinge hole
50 Tooth insert
51 Toothing
52 Insert lug
60 Bearing bracket
61 Base
62 Leg
70 Damping device
71 Gear rim
72 Cylinder
73 Piston rod
74 Clevis
75 Spring
80 Linear guide
81 Outer slide
82 Hinge axis
83 Slotted link guide
84 Rack
85 Inner slide
86 Hinge axis
87 Pivot bearing
88 First gearwheel
89 Second gearwheel
90 Pivot guide
91 Support lever
92 Control lever arm
93 Control lever

The invention claimed is:

1. A furniture board, comprising:
two side faces;
an end face;
an end-face recess; and a hinge integrated or inserted in the end-face recess, wherein the hinge is configured to guide a movable furniture part, wherein the hinge comprises
a basic element;
a linear guide;
a pivot guide having a first side hingedly connected to guided moveable elements of the linear guide; and
a mounting element, which is configured for mounting on the movable furniture part, is directly connected to a second side of the pivot guide, wherein the second side of the pivot guide is opposite of the first side of the pivot guide,
wherein, in a fully open state of the hinge, the hinged connection of the pivot guide to the guided moveable elements of the linear guide is arranged outside of the basic element,
wherein a first one of the two side faces is arranged in a first plane and the second one of the two side faces are arranged in a second plane,
wherein the linear guide and the hinged connection of the pivot guide to the guided moveable elements of the linear guide lie between the first and the second planes, at least in a closed state of the hinge.

2. The furniture board of claim 1, wherein the pivot guide is hinged to the movable furniture part in such a way that, in the closed state of the hinge, the hinged connection of the pivot guide is located between an inner wall and an outer wall of the furniture board.

3. The furniture board of claim 1, wherein the pivot guide is hinged to the movable furniture part in such a way that, in the closed state of the hinge, the hinged connection of the pivot guide is located in front of the furniture board.

4. The furniture board of claim 1, wherein the linear guide has at least one displaceable slide or an adjusting mechanism configured to generate a lifting movement using pivotable levers.

5. The furniture board of claim 4, wherein the pivot guide has at least two mutually spaced-apart hinge axes or a pivot gear with a toothing.

6. The furniture board of claim 1, wherein the linear guide has a slotted link guide that is permanently coupled with the pivot guide, wherein the slotted link guide comprises a control track, which is a cam guide or toothing.

7. The furniture board of claim 1, wherein the hinge has a damping device configured to damp a closing or opening movement of the hinge, wherein the damping device is a linear damper or rotation damper.

8. The furniture board of claim 7, wherein the damping device is coupled to an element of the linear guide.

9. The furniture board of claim 1, wherein the furniture board with the integrated or inserted hinge has a thickness of less than 21 mm.

10. The furniture board of claim 1, wherein the basic element of the hinge has a thickness of less than 16 mm.

11. A furniture item, comprising:
a moveable furniture part; and
a furniture board, which comprises
two side faces;
an end face;
an end-face recess; and
a hinge integrated or inserted in the end-face recess, wherein the hinge is configured to guide the movable furniture part, wherein the hinge comprises
a basic element;
a linear guide;

a pivot guide having a first side hingedly connected to guided moveable elements of the linear guide; and a mounting element, which is configured for mounting on the movable furniture part, is directly connected to a second side of the pivot guide, wherein the second side of the pivot guide is opposite of the first side of the pivot guide, wherein, in a fully open state of the hinge, the hinged connection of the pivot guide is to the guided moveable elements of the linear guide is arranged outside of the basic element, wherein a first one of the two side faces is arranged in a first plane and the second one of the two side faces are arranged in a second plane, wherein the linear guide and the hinged connection of the pivot guide to the guided moveable elements of the linear guide lie between the first and the second planes, at least in a closed state of the hinge.

12. The furniture item of claim 11, wherein the furniture board forms a vertical side wall of the furniture item.

13. The furniture item of claim 12, wherein the movable furniture part is arranged next to another movable furniture part of the furniture item or next to a wall or the furniture item and, in an opened state, an end face of the movable furniture part covers at least part of the end face of the furniture board.

14. A furniture board, comprising:

two side faces;

an end face;

an end-face recess; and a hinge integrated or inserted in the end-face recess, wherein the hinge is configured to guide a movable furniture part, wherein the hinge comprises a basic element;

a linear guide;

a pivot guide having a first side hingedly connected to guided moveable elements of the linear guide; and a mounting element, which is configured for mounting on the movable furniture part, is directly connected to a second side of the pivot guide, wherein the second side of the pivot guide is opposite of the first side of the pivot guide, wherein, in a fully open state of the hinge, the hinged connection of the pivot guide to the guided moveable elements of the linear guide is arranged outside of the basic element, wherein a first one of the two side faces is arranged in a first plane and the second one of the two side faces are arranged in a second plane, wherein the linear guide and the hinged connection of the pivot guide to the guided moveable elements of the linear guide lie between the first and the second planes, at least in a closed state of the hinge, wherein the mounting element is a hinge cup having a bracket attachment, and wherein the guided moveable elements of the linear guide are levers, a bearing bracket coupled to the bracket attachment and to the levers of the linear guide to form the pivot guide by a pivotable bearing of the bearing bracket in the bracket attachment of the hinge cup.

15. The furniture item of claim 11, wherein the mounting element is a hinge cup having a bracket attachment, wherein the guided moveable elements of the linear guide are levers, a bearing bracket coupled to the bracket attachment and to the levers of the linear guide to form the pivot guide by a pivotable bearing of the bearing bracket in the bracket attachment of the hinge cup.

* * * * *